United States Patent [19]

Haisfield

[11] Patent Number: 5,253,216
[45] Date of Patent: Oct. 12, 1993

[54] SONAR COUNTERMEASURE

[75] Inventor: Rudolph M. Haisfield, Silver Spring, Md.

[73] Assignee: The United States of America as represented by the Secretary of the Navy, Washington, D.C.

[21] Appl. No.: 248,165

[22] Filed: Dec. 28, 1962

[51] Int. Cl.$^5$ .............................................. H04K 3/00
[52] U.S. Cl. .................................................... 367/1
[58] Field of Search ................... 340/3, 5, 6, 16, 5 D, 340/5 S, 7; 181/0.51, 0.53; 343/18, 113.2; 367/1

[56]      References Cited
U.S. PATENT DOCUMENTS 2,540,035  1/1951  Rodman .
2,972,732  2/1961  Hammond, Jr. .
2,975,396  3/1961  Mueller .
3,113,286  12/1963  Miller et al. .

Primary Examiner—Ian J. Lobo
Attorney, Agent, or Firm—Thomas E. McDonnell; Charles J. Stockstill

[57] ABSTRACT

A countermeasure for acoustic homing torpedoes where a plurality of sound transducers are transversely arrayed across the attack path of the torpedo. The transducers are energized in a time sequence to simulate a relative transducer movement in a direction across the path of the torpedo. The torpedo is thereby misdirected by the high level acoustic signal produced in the transducers slowly changing the location of the signal. The signal is interrupted to provide a silent period, such absence of a signal being interpreted by the torpedo as a miss causing the torpedo to initiate a turn and commence a search which will "exhaust" the torpedo. This sequence is repeated while the torpedo is within a close range of the target.

3 Claims, 3 Drawing Sheets

SONAR COUNTERMEASURE

The invention described herein may be manufactured and used by or for the Government of the United States of America for governmental purposes without the payment of any royalties thereon or therefor.

The invention relates to countermeasures for use against acoustic homing torpedoes. More specifically, it relates to a reusable countermeasure that can be permanently mounted on the hulls of submarines and surface ships without inhibiting their normal functions.

Of the many weapons which have been devised for use against surface ships and submarines, the most effective continues to be the torpedo. The range and speed of these weapons has been increased to such an extent even the most sophisticated vessels cannot ignore their capability. In addition these weapons have been provided with advanced guidance systems which can "home" on a particular characteristic of a chosen target.

One of the most successful of these guidance systems is based on acoustic characteristics of the target. Two characteristics are employed, self noise which is generated solely by the target and sound reflection in which case the sound may come from the torpedo. The first requires only a passive sound receiver, while the second requires a separate sound source or a pulse-echo sonar unit. A sonar unit can detect either characteristic and hence is said to operate in passive or active modes, i.e., with or without its transmitter.

Operation in the passive mode is most desirable for long range torpedoes for at least two reasons. First, the active system tends to alert the target and the long transit time permits successful evasion. Second, by shifting to the active mode only at short ranges, the transmitter may be operated at a higher frequency, which attenuates more in propagation but provides greater resolution and accuracy. The shift from passive to active modes of operation generally occurs when the self noise signal from the target exceeds a preset threshold in the torpedo. If the signal, having once exceeded the threshold, again falls below it, the torpedo circles and searches in the passive or active mode until contact is re-established.

An object of the present invention is to provide an apparatus and method, employing a hull mounted sound transducer array, for misdirecting the guidance system of homing torpedoes of the type discussed above.

A more specific object of the invention is to provide a scanning apparatus and method for misdirecting acoustic homing torpedoes at close range by a technique known as "side lobe capture".

Another more specific object of the invention is to provide an apparatus and method of misdirecting an acoustic homing torpedo by a technique known as "exhaustion".

These and other objects or attendant advantages of the invention will be best understood with reference to the following specification, taken in conjunction with the accompanying drawings wherein.

Figure 1:
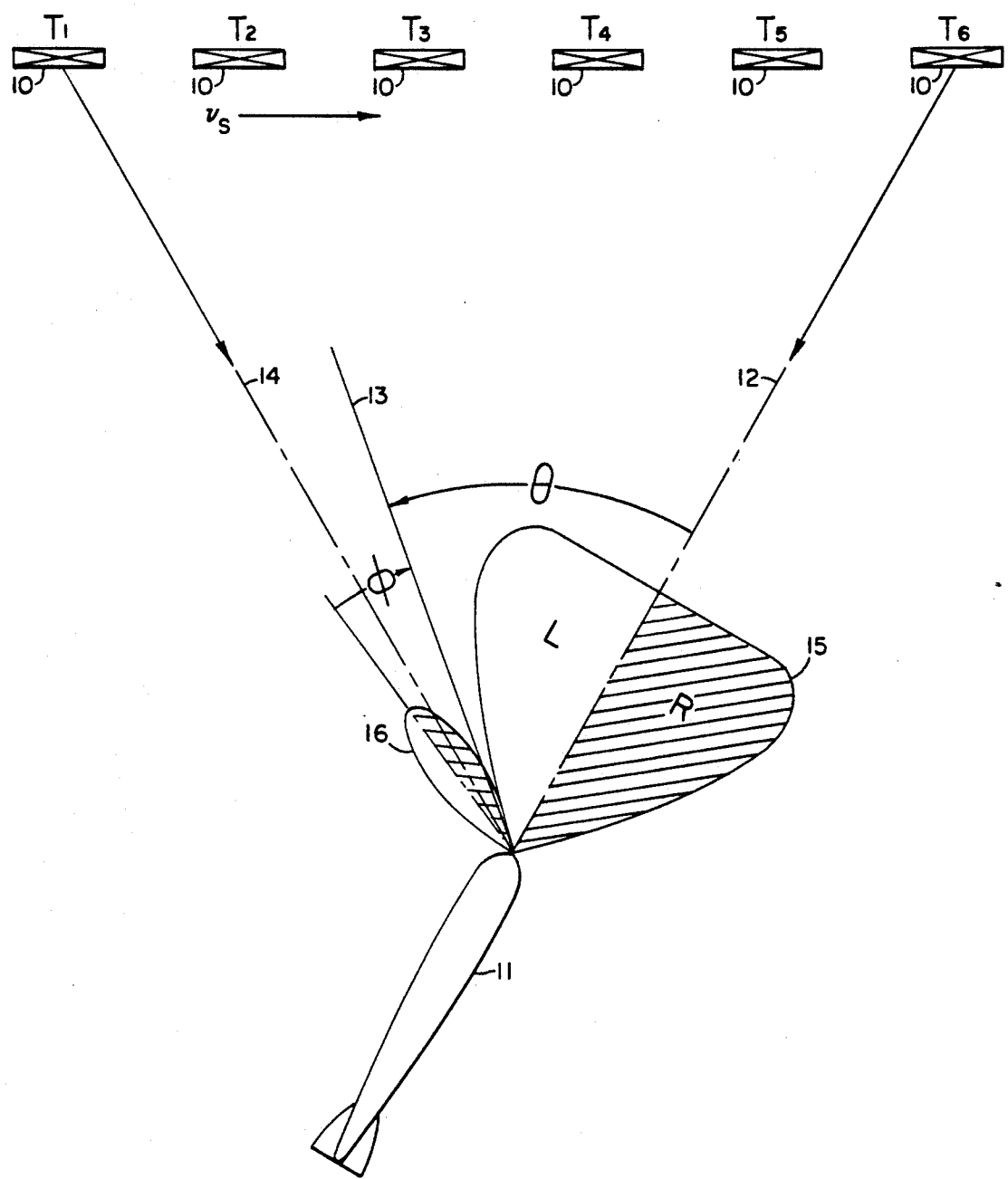
FIG. 1 shows a torpedo approaching a transducer array with details of the torpedo's receiving pattern and sound rays propagating from the array.

Referring to FIG. 1 there is shown a linear array of transducer subassemblies 10, labeled in accordance with their spacial sequence $T_1$, $T_2$, $T_3$, etc. The number of subassemblies and their spacing may vary according to the size of the target and the power handling capabilities of the transducers. Excellent results have been obtained using six subassemblies of magneto-strictive transducers of 8 watts capacity spaced approximately sixty feet apart. It is expected that even better results can be obtained with more powerful transducers and closer spacing in an array of the same total length.

The torpedo 11 generally contains at least three separate transducers capable of receiving vibrations from subassemblies 10 with maximum amplitude when the axis 12 of the torpedo is pointed at the latter, as it is to $T_6$. This amplitude drops sharply as indicated by the teardrop shape of the receiving pattern 15 until a null is reached at the angle $\theta$. In three dimensions this null is defined by a generally conical surface generated by line 13 about the torpedo axis. Beyond this null the amplitude again rises, but to a much lower maximum amplitude in an addition angle distance $\phi$, this time over a conical surface generated by line 14. A second null occurs at some greater angle over another conical surface. The number of times this variation is repeated depends on the frequency of the signal, the spacing of the torpedo transducers and the individual directivity of the transducers.

Phase detectors in the torpedo determine whether the change in amplitude is due to reception from angles in the shaded area or the clear area and cause the torpedo to swing right or left as indicated. A similar function occurs in a plane normal to the drawing with phase detectors directing the torpedo up or down. These features of a homing torpedo are well known to those skilled in the art and will not be labored further. The teardrop region 15 around the torpedo axis is called the main lobe. The region 16, which has the same cross section as a teardrop, is called a secondary lobe and is toroidal in shape. The shaded and clear areas in this lobe correspond to those in the main lobe with important differences to be discussed later.

Figure 2:
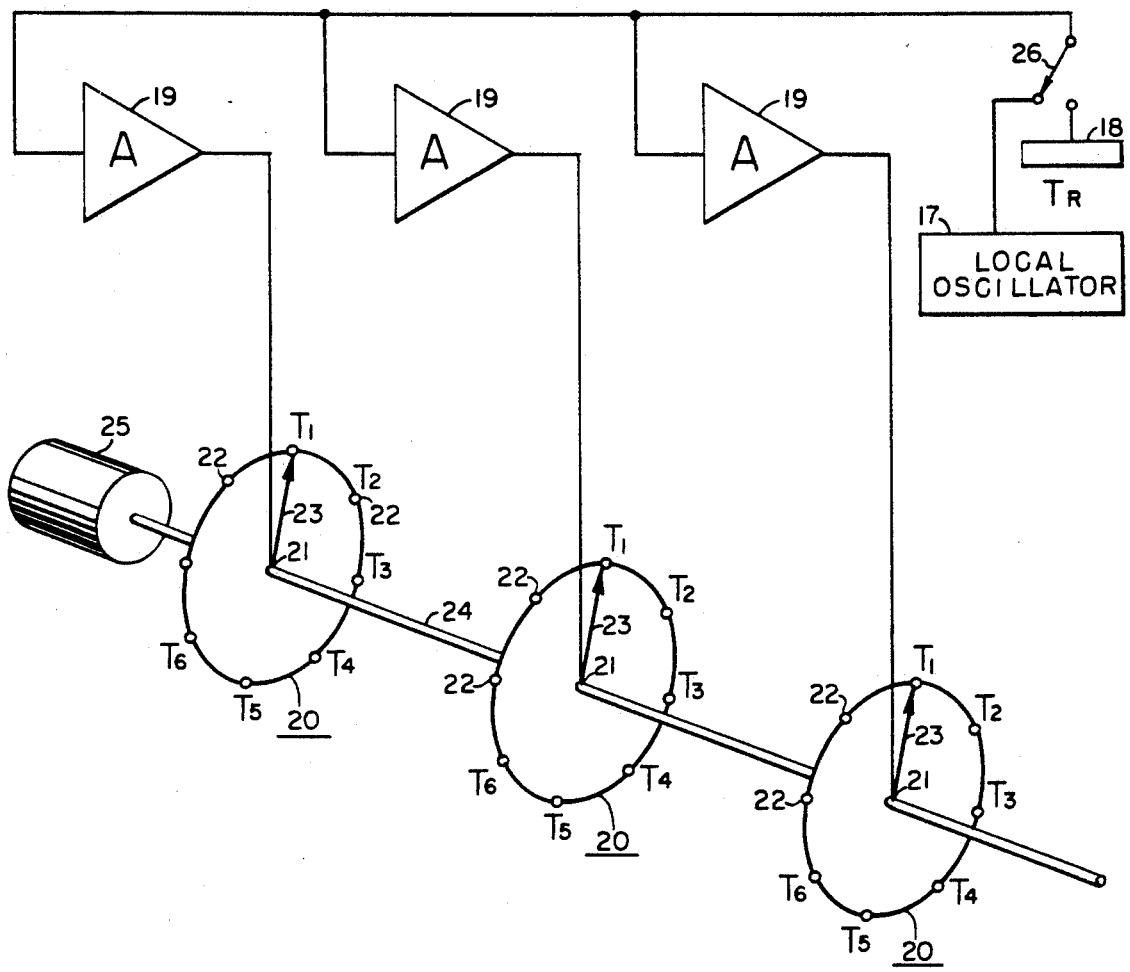
FIG. 2 shows the electronic circuits coupled to the array of FIG. 1.

Turning to FIG. 2 there is shown the circuit which energizes the transducer subassemblies $T_1$–$T_6$. The signals for this purpose may be obtained from a local oscillator or noise generator 17 or a receiving transducer 18. The choice of either source will generally depend on the type of torpedo and its mode of operation.

The oscillator will generally be used when the torpedo is operating in a passive mode. The choice of frequency range is generally not critical, since the receiver of the torpedo to be effective in this mode must operate at low frequencies with sufficient bandwidth for target recognition. As will be evident later frequency scanning may be employed effectively.

The receiving transducer is preferred when the torpedo is operating in the active mode. Such torpedoes frequently employ coded signals in order to better recognize their own echoes. The only effective means of countering such a torpedo is to amplify the coded signals and reradiate them.

Before application to the target transducers the signal is passed through a switching circuit. This circuit contains a plurality of signal channels, each containing an amplifier 19. The amplifiers have a common input coupled to the local oscillator or receiving transducer through the single pole double throw mode switch 26. The output of each amplifier is coupled to the pole 21 of a separate single pole multithrow power switch 20. Enough output taps 22 are provided on each power switch to supply one of the transducers in each subassembly. The number of transducers 10 used determines the peak power output and the beam pattern for each subassembly.

The rotors 23 of the various switches are ganged on a single shaft 24 to operate in unison. A timing motor 25 is connected to the end of the shaft. The motor employs a speed reducer and speed control (not shown) so that the switching cycle can be varied from 3 to 15 seconds. As a compromise, a constant speed to provide a cycle of 5 seconds may be employed. The rotors connect all of the transducers in a subassembly of the array at the same time. Instead of a motor and mechanical switches electronic timing circuits may be used.

Operation of the device is easily explained in terms of the structure already set forth. After a signal is established either by the local oscillator or the receiving transducer, one or more of the amplifiers 19 are turned on and motor 25 is energized. One of the subassemblies 10 is thus energized and the position of the active subassembly shifts along the array as indicated by the scan vector $v_s$. As soon as the last subassembly is turned off the sequence is repeated. The motor may employ a geared limit switch to provide a desired number of sequences or this may be controlled manually. The motor may also be made reversible to reverse the direction of scan.

Referring to FIG. 1 the effect on the torpedo may be deduced from its receiving pattern. At great distances the angular scope of the major lobe 15 will include the entire array regardless of which subassembly the torpedo is homing on, so that only a slight angular oscillation is induced in its path of travel due to the scan. As the torpedo nears the target or array these oscillations grow until the torpedo assumes the position shown in FIG. 1 with the torpedo having a clockwise angular velocity under the influence of subassembly $T_6$. As can be seen the signal from the subassembly $T_1$ which will radiate next cannot radiate into the major lobe, but strikes the secondary lobe in the shaded portion causing torpedo to veer right.

The sequence of events from this point on are determined by the design of the torpedo. The signals from the target far exceed the operating thresholds of the torpedo's receiving circuits so that additional secondary lobes, if present may be affected as the torpedo veers. The dynamics of the steering system eventually turn the pattern to an angle where the signal is lost entirely and the torpedo resorts to a preprogrammed search phase.

It should also be noted that, instead of homing on a point, the secondary lobe provides a circular region of stability, so that vertical steering errors occur even though the initial deflection was horizontal.

Figure 3:
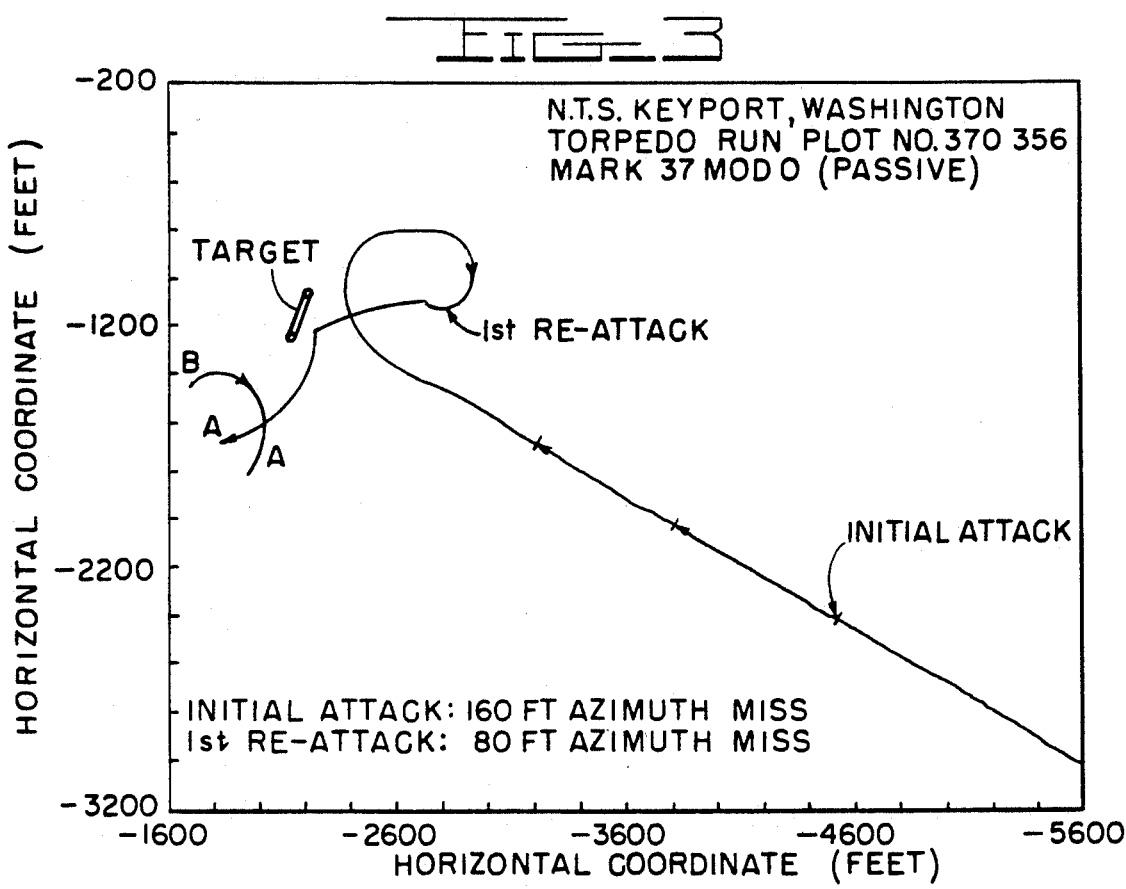
FIG. 3 shows a typical run of a torpedo when the technique of "side lobe capture" is employed.

FIG. 3 shows a typical run of a torpedo against a target protected by the present countermeasure. Not only was the initial attack deflected, but two reattacks were also countered. If the countermeasure is left on, the torpedo circles the array at varying depths above and below the array.

Figure 4:
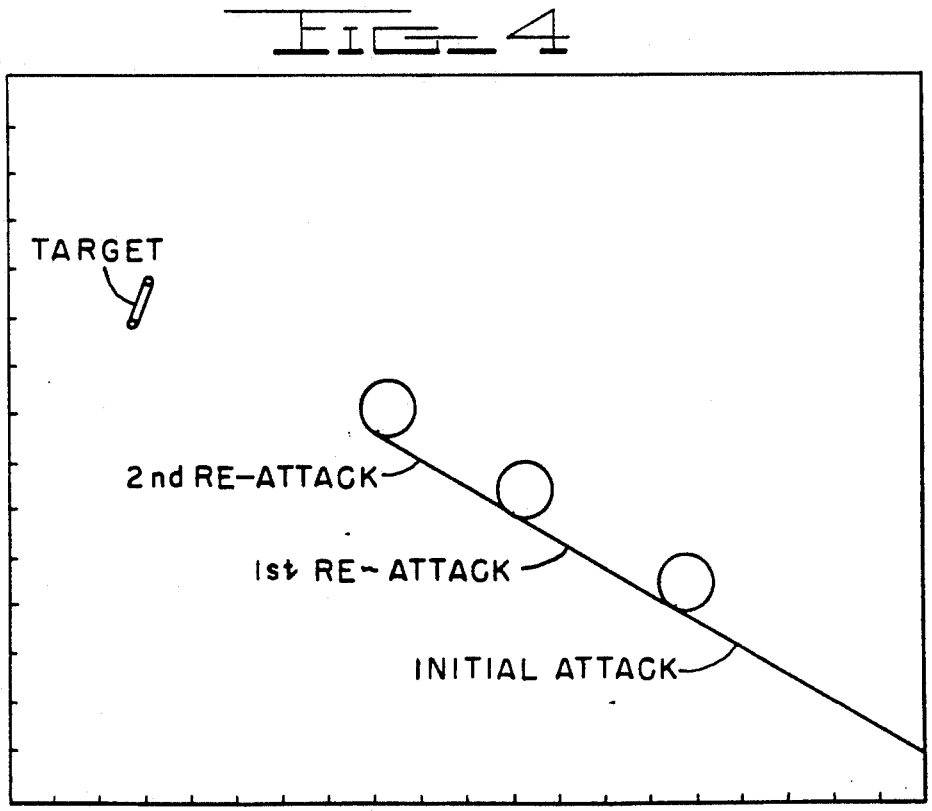
FIG. 4 shows a typical run of a torpedo when the technique of "exhaustion" is employed.

FIG. 4 shows a torpedo run using the countermeasure in a different mode of operation. The subassemblies were operated simultaneously for several seconds and interrupted several seconds. This caused the torpedo to circle each time the transducers were turned off. The attacks end when the fuel in the torpedo is spent or a preset timer destroys the weapon.

It is believed the sudden absence of a strong signal is interpreted by the torpedo as a miss and an indication that it turn and search. Such a turn would expose the secondary lobes to capture by the next countermeasure signal. This method is "exhaustion" to differentiate it from close range "side lobe capture". The tests shown in both FIGS. 3 and 4 were made with a constant source of propeller noise radiating from one end of the array to similate evading conditions of the target.

Obviously many modifications and variations of the present invention are possible in the light of the above teachings. It is therefore to be understood that within the scope of the appended claims the invention may be practiced otherwise than as specifically described.

What is claimed is:

1. A countermeasure for acoustic homing torpedoes comprising:
   a plurality of underwater sound transducers transversely arrayed across the attack path of said torpedo,
   switching means for energizing said transducers in time sequence to simulate relative transducer movement in one direction across said path, and receiver means coupled to at least one of said transducers for converting underwater vibrations in the proximity of said sound transducers to electrical signals, the output of said receiver means being coupled to said switching means.

2. The method of misdirecting a homing acoustic torpedo from a target comprising;
   radiating a high level acoustic signal in the direction of said torpedo from a small area of the target surface,
   slowly changing the location of said area from one end of the target to the other and repeating the preceding at least once.

3. The method of misdirecting a long range acoustic homing torpedo from a target comprising;
   radiating a high level acoustic signal from the target in the direction of said torpedo from a small area of the target surface for an active period of several seconds,
   interrupting said signal for a silent period, slowly changing the location of said area from one end of the target to the other, and
   repeating the preceding until the torpedo is within close range of the target.

* * * * *